2,701,770

FATTY COMPOSITIONS AND METHODS OF MAKING SAME

Noel H. Kuhrt, Rochester, N. Y., assignor to Eastman Kodak Company, Rochester, N. Y., a corporation of New Jersey No Drawing. Application May 17, 1954,
Serial No. 430,428

19 Claims. (Cl. 99—163)

This invention relates to fatty compositions and methods of making such compositions and is particularly concerned with fortified and stabilized compositions consisting predominantly of fatty triglycerides.

Fatty materials such as animal fats and vegetable oils, both hydrogenated and unhydrogenated, are widely used as components of food, such as salad oils, spreads, and shortenings, as well as for frying, or greasing cooking pans. Such fatty triglyceride compositions, as well as fatty acids which find wide industrial use, are subject to oxidation and resultant rancidity, particularly when they contain some unsaturated or partially saturated components. Stabilization of such compositions against rancidity thus is necessary in commercial practice.

The fatty triglyceride compositions used as shortenings are also commonly fortified with varying amounts of fatty acid monoglycerides in order to enhance their shortening action. In the case of the fortified shortenings, there are two prime considerations, first, stabilization against rancidity and, secondly, maintenance of a high level of shortening activity during extended periods of storage.

The rancidity or state of oxidation of the shortening is apparently not directly correlated to the shortening activity since the shortening gradually decreases in shortening activity even while the peroxide value of the composition remains at or near zero. Various stabilizers have been added to the shortening compositions and are successful in extending the stability against oxidative rancidity, but without obviating the loss of shortening activity. Such conventional stabilizers have included the phenolic antioxidants such as butylated hydroxy anisole, and other well-known antioxidants such as citric acid, propyl gallate and the like.

It is accordingly an object of this invention to provide new fatty compositions having improved stability against oxidative rancidity.

It is a further object of this invention to provide fatty compositions fortified with fatty acid monoesters such as monoglycerides and characterized by continued high activity for extended periods of time.

Another object of the invention is to provide shortening compositions having improved resistance against oxidative rancidity and greatly prolonged high level shortening activity.

Another object of the invention is to provide new and improved methods of making highly stable fatty compositions.

Another object of the invention is to provide a simple but effective method of stabilizing and fortifying shortening compositions.

A further object of the invention is to provide a method of making fatty compositions not subject to development of objectionable rancidity during normal storage conditions nor susceptible to undue loss of activity at ordinary temperatures.

Another object of the invention is to provide new shortening compositions containing stabilizing and fortifying material which does not deleteriously affect the other chemical and physical properties of the shortening.

Another object of the invention is to provide a new method of improving both animal fats and vegetable oils, whether hydrogenated or not.

Other objects will be apparent from the description and claims which follow.

These and other objects are attained by means of this invention as described more fully hereinafter, particularly with reference to certain preferred embodiments, and as defined in the appended claims.

The compositions embodying the present invention are fatty compositions consisting predominantly of fatty triglycerides or fat-forming fatty acids normally subject to oxidation. The fatty triglycerides can be any of the well-known fats or fatty oils, including the animal fats such as lard, tallow or the like, and vegetable oils such as cottonseed oil, soybean oil, peanut oil, coconut oil, corn oil and the like, whether hydrogenated or unhydrogenated; and the fatty acids include any of the pure or mixed unsaturated fatty acids such as oleic acid or linoleic acid. The invention is particularly applicable for preparing fortified animal or vegetable shortening compositions, such shortening compositions consisting predominantly of the well-known lard or hydrogenated vegetable oil shortenings.

These fatty triglycerides are fortified and stabilized in accordance with this invention by the addition thereto of a minor amount of fatty acid monoester of a polyhydric alcohol, and preferably a monoglyceride, premixed with stabilizing amounts of glycine and phosphoric acid, the addition being effected at a temperature not higher than 120° C.

The fatty acid monoglycerides are prepared by effecting ester-interchange between an animal fat or a vegetable oil or a fatty acid, and glycerine in the presence of an ester-interchange catalyst at elevated temperatures in accordance with well-known practice, other monoesters being similarly obtained with other polyhydric alcohols such as sorbitol, mannitol or the like. Thus, the monoglycerides employed in practicing this invention include mixed monoglycerides as typified by vegetable oil monoglycerides such as cottonseed oil monoglycerides, soybean oil monoglycerides, peanut oil monoglycerides, coconut oil monoglyceride, or animal fat monoglycerides such as lard monoglycerides or the like; or single monoglycerides such as glyceryl monostearates, glyceryl monooleates, glyceryl monopalmitates or the like. The monoglycerides employed can be admixed with diglycerides such as the monoglyceride-diglyceride reaction products obtained by ester-interchange reactions, but preferably consist of at least 85 to 90 percent monoglycerides as obtained by vacuum distillation or other separation of monoglycerides from such reaction products.

The fatty materials, such as the fatty triglycerides, are preferably admixed with from 0.5% to 5% by weight of the monoglyceride based on the weight of fatty triglycerides for optimum results, although greater or lesser amounts can be used in some cases, as for example from 0.1% to 10% by weight. The monoglyceride is added in the form of a stabilized premixture obtained by associating glycine and phosphoric acid with the monoglyceride at a temperature not above 95° C. For example, the monoglyceride is first stabilized by being premixed with glycine and phosphoric acid, optimum stabilization being obtained by treating the monoglyceride with the glycine and phosphoric acid at a temperature of at least 50° C. and preferably below 95° C. The resulting stabilized monoglyceride composition when added to the fatty triglyceride imparts greatly enhanced stability against oxidative rancidity to the fatty composition, as well as increased and prolonged shortening activity in the case of the fatty triglyceride shortenings. This behavior is particularly anomalous since conventional monoglycerides impart enhanced shortening action but do not stabilize fatty triglycerides to any substantial degree against either oxidative rancidity or gradual loss in shortening activity, and glycine and phosphoric acid neither stabilize nor fortify fatty triglycerides when added to fatty compositions in the usual manner of adding stabilizers. Furthermore when monoglycerides, glycine and phosphoric acid are added to the fatty triglycerides without premixing in accordance with this invention, the results obtained are not comparable to those attained by means of this invention.

The glycine and phosphoric acid can be mixed together and then added to the monoglyceride but they are preferably added separately. The addition is desirably effected in the form of a solution of the stabilizers in glycerine or other suitable solvent. The mixing can be effected at room temperature in which case the resulting mixture is preferably heated to at least 50° C. for at least from a few seconds to several hours, or the glycine and phosphoric acid can be added to a heated monoglyceride composition. The treatment of the monoglyceride should be effected at a temperature not higher than 95° C. in order to obtain the stabilizing effect, higher temperatures being effective to greatly reduce the stabilization. It is feasible, however, to add the stabilizing ingredients to the monoglyceride at a temperature somewhat higher than 95° C. and then promptly to cool the mixture below that temperature. The temperature which can be employed will, of course, depend upon the duration of heating with one-half hour being the maximum desirable period for temperatures of 90–95° C. While the 50° lower temperature specified is one of practical importance, the invention is not limited thereto unless otherwise indicated. The glycine is desirably added as such for best results although it can be added in the form of the sodium salt or similar salt if desired or in the form of a crude amino acid mixture such as is obtained by hydrolysis of soybean meal or other protein. Such materials furnishing glycine are within the scope of the invention. Other amino acids do not appear to give the improved results obtained in accordance with this invention. Similarly, phosphoric acid itself is desirably employed although phosphoric acid-furnishing materials such as sodium salts of phosphoric acid can be used and are within the scope of the invention.

The glycine and phosphoric acid give best results when employed in substantially equal amounts and particularly with the phosphoric acid employed in amounts of not more than twice the weight of glycine, although larger amounts of glycine are not particularly deleterious and, in some cases, desirable. The glycine and phosphoric acid respectively are preferably employed in amounts of from 0.01% to 0.04% by weight based on the weight of the monoglycerides, or a concentration of glycine and phosphoric acid respectively of from 0.00005% to 0.02% by weight on the finished fatty composition. Larger amounts can be employed, of course, but are usually not necessary since the stabilities obtained with the preferred amounts under accelerated test conditions are equivalent to many months of even years of normal storage.

Stabilization of the premixture of monoglyceride, glycine and phosphoric acid is obtained by maintaining these materials in association at a temperature not higher than 95° C. as described. After such stabilization is obtained, however, the stabilized premixture can be heated as high as 120° C. without destroying the stabilization. Preferably, however, the premixture is maintained at a temperature not higher than about 100° to 101° C. since the stabilizing action of the glycine and phosphoric acid is largely destroyed by heating to temperatures above 120° C., apparently due to breakdown of the stabilizing materials.

The stabilized mixture of monoglyceride, glycine and phosphoric acid is then thoroughly mixed into the fatty triglyceride vehicle, such as a shortening. The addition of the mixture to the vehicle is facilitated by elevated temperatures effective to soften or liquefy the solid fatty triglycerides when such normally solid vehicles are used. The temperature should be not higher than 120° C. and desirably not higher than about 100° C. so as not to destroy the effectiveness of stabilization. The resulting stabilized compositions retain stability against oxidative rancidity and loss of activity for prolonged periods of storage at temperatures below 100° C. and can be heated as to much as 120° C. for brief periods particularly shortly before use.

The stability against oxidative rancidity of the compositions embodying this invention is evaluated by means of the accelerated Active Oxygen Method (AOM), sometimes also called the Swift Stability Test, in which the fatty compositions are heated at 96° C. with air bubbling through the sample and the peroxide content in millimols per kilogram of sample is determined. A peroxide value (P. V.) of 20 is usually considered the permissible maximum insofar as rancidity is concerned.

The improved stability against oxidative rancidity of the new fortified vegetable oil shortenings embodying this invention as compared to conventional fortified vegetable oil shortenings is shown in Table 1. The conventional shortenings consisted predominantly of partially hydrogenated cottonseed and soybean oils and was fortified, as shown in the table, with varying amounts of cottonseed oil monoglycerides which had not been treated in accordance with this invention. The shortening was stabilized in the conventional manner with citric acid and butylated hydroxy anisole.

The shortening composition embodying this invention consisted of the same mixture of hydrogenated cottonseed and soybean oils fortified with cottonseed oil monoglycerides stabilized with 0.02% glycine and 0.02% phosphoric acid based on the weight of monoglyceride. These compositions are listed respectively as "Conventional" and "New" in the table depending upon the type of monoglyceride additive.

Table 1

| Type | Monoglyceride, percent | Hrs. to P. V. 20 (AOM) |
|---|---|---|
| Conventional | 1.25 | 40 |
| Do | 2.5 | 42 |
| New | 1.0 | 85 |
| Do | 1.25 | 88 |
| Do | 1.5 | 93 |
| Do | 2.0 | 102 |

As can be seen from the table, the fatty composition including the glycine-phosphoric acid stabilized monoglyceride has more than twice the stability of the conventional shortening stabilized in accordance with best practices prior to this invention.

Similarly improved results are obtained with other compositions consisting predominantly of fatty triglycerides. Thus, for example, lard when admixed with a premixed mixture of monoglyceride, glycine and phosphoric acid in accordance with this invention has greatly enhanced stability against oxidative rancidity as shown in Table 2.

Table 2

| Vehicle | Stabilizer | Hrs. to P. V. 20 (AOM) |
|---|---|---|
| Lard | None | 2 |
| Do | 1.5% Monoglyceride premixed with 0.02% glycine+0.02% H₃PO₄ | 24 |

Fat-forming fatty acids are similarly stabilized. Thus, 2% by weight of monoglyceride, containing 0.02% glycine and 0.02% phosphoric acid, both based on the monglyceride, was added to commercial bleach oleic acid (iodine value 89) and the stability of the oleic acid was increased 350%.

The invention is of even greater utility in the maintenance of shortening activity over prolonged periods. Conventional shortenings are usually stabilized against oxidative rancidity and require many hours, even under accelerated conditions, to become rancid (i. e. to reach a peroxide value of 20). Nevertheless, such conventional shortings gradually decrease in shortening activity upon storage even though the peroxide value of the shortening remains substantially at zero. This lessening of shortening activity is evaluated in accordance with well-known practice by employing the shortening in a standard cake recipe under standard conditions and measuring the cake volume obtained.

Thus a conventional hydrogenated lard shortening fortified with ordinary monoglyceride and stabilized with conventional antioxidants had a stability of 130 hours, i. e. it required 130 hours to reach a peroxide value of 20 under the accelerated test conditions. A fresh sample of this conventional shortening gave a cake volume of 975 ml. in a standard test recipe. The conventional shortening was then aerated for 18 hours at 90° C. The resulting composition still had a peroxide value of zero, but gave a cake volume of only 855 ml. in the same standard test recipe.

Similarly, a sample of conventional hydrogenated vegetable oil shortening, when freshly prepared, gave a cake volume of 910 ml. in a standard 140% sugar white cake recipe, whereas the same shortening, after standing for 6 months under refrigeration, gave a cake volume of only 855 ml. in the same recipe.

The results obtained employing compositions embodying this invention are shown in Table 3. In this case, the various shortening compositions had been stored in cans at room temperature for three weeks before use. Each of the shortenings is a conventional hydrogenated vegetable oil shortening. The sample designated "Standard" is an unfortified shortening, the samples designated "Conventional" are shortenings fortified with monoglyceride in accordance with best commercial practices prior to this invention, and the samples designated "New" are shortenings prepared in accordance with this invention employing monoglycerides of 90% purity stabilized with 0.02% glycine and 0.02% phosphoric acid. The test recipe was a standard 140% sugar white cake recipe.

Table 3

| Composition | Percent Monoglyceride | Cake Vol. (ml.) |
| --- | --- | --- |
| Standard | 0 | 710 |
| Conventional | 1.25 | 860 |
| Do | 2.5 | 880 |
| New | 1.0 | 920 |
| Do | 1.25 | 975 |
| Do | 1.50 | 1,010 |

Thus, it is apparent that the compositions embodying this invention have enhanced shortening activity as compared to conventional unfortified and fortified shortenings.

The maintenance of high level activity by compositions embodying this invention is illustrated in Table 4. A monoglyceride composition containing a substantial proportion of diglycerides was prepared by effecting ester-interchange between partially hydrogenated cottonseed oil and glycerine to form a reaction product containing about 40% monoglycerides, 30% diglycerides and 30% triglycerides. This reaction product was then stabilized, without further concentration of the monoglycerides, by adding thereto 0.02% glycine and 0.02% phosphoric acid by weight, based on the weight of monoglyceride, in the form of a 4% solution in glycerol. The addition was made with the monoglyceride reaction product at a temperature of about 90° C. The resulting stabilized monoglyceride composition was then added to a hydrogenated cottonseed oil shortening at a temperature of about 90° C., in an amount of 8% by weight of the reaction product based on the weight of shortening. Similar compositions were prepared by 8% addition of citric acid-stabilized reaction product to the same shortening and the stabilized and unstabilized compositions were tested as shown in Table 4.

Table 4

| Composition | Aeration (Hrs. at 90° C.) | Cake Vol. (ml.) |
| --- | --- | --- |
| 1. Shortening+Citric acid-stabilized monoglyceride reaction product | 0 | 918 |
| 2. Shortening+Citric acid-stabilized monoglyceride reaction product | 20 | 807 |
| 3. Shortening+Glycine-H$_3$PO$_4$-stabilized monoglyceride reaction product | 20 | 882 |

As can be seen from Table 4, the stability against loss of shortening activity of compositions embodying this invention is much better than conventional compositions. It should be noted that the original shortening employed had been stabilized in accordance with conventional practices against oxidative rancidity.

As set out hereinabove, a fatty composition is not considered to be rancid until a peroxide value of 20 is reached. The data set out in Table 5 shows that, even though the shortening is not rancid, conventional fortified shortenings suffer a considerable loss in shortening activity under conditions in which compositions embodying this invention maintain a high level of shortening activity. A conventional unfortified hydrogenated vegetable oil shortening was fortified with 1.5% by weight of cottonseed oil monoglycerides obtained by vacuum distillation of the reaction product of cottonseed oil and glycerine and having a monoglyceride content in excess of 90%. Some of the samples were stabilized with citric acid and others were stabilized with glycine and phosphoric acid in accordance with this invention. The peroxide values of the finished composition were tested under varying conditions as well as the shortening activity in a standard 140% sugar white cake recipe. It will be noted that in no case was the shortening composition rancid under the test conditions.

Table 5

| Stabilizer | Aeration Hrs. at 90° C. | Peroxide Value of Composition | Cake Volume, ml. |
| --- | --- | --- | --- |
| Citric acid | 0 | 0 | 905 |
| Glycine+H$_3$PO$_4$ | 0 | 0 | 938 |
| Citric acid | 22 | 6 | 848 |
| Glycine+H$_3$PO$_4$ | 22 | 4 | 932 |
| Citric acid | 46 | 12 | 847 |
| Glycine+H$_3$PO$_4$ | 46 | 8 | 907 |

Thus, after being aerated for 46 hours at 90° C., the shortening activity of the composition embodying this invention was as high as the original activity of the conventional shortening stabilized with citric acid.

Thus, by means of this invention, compositions consisting predominantly of fatty triglycerides, whether hydrogenated or not, are readily prepared and exhibit a high degree of stability against oxidative rancidity and also against loss of shortening activity.

This application is a continuation-in-part of my copending applications Serial Nos. 253,468 and 253,470, both filed October 26, 1951.

The stabilization of monoglycerides and similar monoesters with glycine and phosphoric acid is disclosed and more particularly claimed in the parent application Serial No. 253,468 and in a continuation-in-part thereof filed concurrently herewith.

While the invention has been described in considerable detail with reference to certain preferred embodiments thereof, it will be understood that variations and modifications can be effected within the spirit and scope of the invention as described hereinabove and as defined in the appended claims.

I claim:

1. A fatty composition consisting predominantly of fatty material of the group consisting of fatty triglycerides and fat-forming fatty acids, and containing a minor amount of a stabilized premixture of a higher fatty acid monoester of a polyhydric alcohol with glycine and phosphoric acid, said stabilized premixture having been obtained at a temperature below 95° C.

2. A fatty composition consisting predominantly of fatty acid triglycerides and containing a minor amount of a stabilized premixture of a higher fatty acid monoglyceride, glycine and phosphoric acid obtained at a temperature not above 95° C.

3. A fatty composition comprising a predominant portion of fatty triglycerides selected from the group consisting of hydrogenated and unhydrogenated animal fats and vegetable oils and minor portions of higher fatty acid monoglyceride, glycine and phosphoric acid, said monoglyceride, with said glycine and said phosphoric acid being a stabilized premixture obtained at a temperature below 95° C. and admixed with said fatty triglycerides at a temperature not above 120° C.

4. A shortening fortified with a premixture of higher fatty acid monoglyceride containing glycine and phosphoric acid effective to stabilize said monoglyceride, said monoglyceride, glycine and phosphoric acid premixture having been obtained at a temperature not higher than 95° C., said fortified shortening having been maintained at a temperature not higher than 120° C.

5. An improved shortening composition comprising a predominant amount of a vegetable oil shortening, and mixed therethrough a premixture of vegetable oil monoglyceride effective to enhance the shortening action of said vegetable oil shortening, glycine and phosphoric acid, said monoglyceride, glycine and phosphoric acid premixture having been obtained at a temperature not higher than 95° C., said shortening composition containing said premixture having been unheated to a temperature higher than 120° C.

6. An improved shortening composition comprising a mixture, at least one half of which is of an animal fat shortening, and a stabilized premixture of higher fatty acid monoglyceride effective to enhance the shortening action of said animal fat shortening, glycine and phosphoric acid, said stabilized premixture of monoglyceride, glycine and phosphoric acid having been obtained at a temperature not above 95° C., said shortening composition containing said premixture having been unheated above 120° C.

7. A normally liquid fatty oil having dissolved therein a premixed and stabilized mixture of higher fatty acid monoglyceride, glycine and phosphoric acid, said premixed mixture of monoglyceride, glycine and phosphoric acid having been stabilized at a temperature not above 95° C.

8. A fatty composition comprising at least 85% of fatty triglycerides, and having dispersed therein a premixture, stabilized by heat treatment at a temperature not above 95° C., of not more than 5% of higher fatty acid monoglycerides, not more than 0.02% of glycine and not more than 0.02% of phosphoric acid, all based on the total composition weight.

9. A shortening fortified with from 0.5% to 5.0% of higher fatty acid monoglycerides and stabilized with from 0.00005% to 0.02% of glycine and from 0.00005% to 0.02% of phosphoric acid, all based on the total composition weight, said phosphoric acid being present in an amount not greater than twice the weight of said glycine, said monoglycerides, glycine and phosphoric acid having been a stabilized premixture obtained at a temperature not above 95° C.

10. An at least partially hydrogenated vegetable oil shortening fortified with from 0.5% to 5.0% by weight of cottonseed oil monoglycerides, said monoglycerides containing glycine and phosphoric acid effective to stabilize said monoglycerides, said monoglycerides, glycine and phosphoric acid having been a stabilized premixture obtained at a temperature not above 95° C., said fortified shortening being unheated above 120° C. during addition of said premixture to said shortening.

11. A shortening containing a stabilized premixture of cottonseed oil monoglycerides, glycine and phosphoric acid, said glycine and phosphoric acid each being present in an amount of substantially 0.02% of the weight of said monoglycerides, said monoglycerides amounting to from 0.5% to 5% of the weight of said shortening, said stabilized premixture having been obtained at a temperature not above 95° C. and added to said shortening at a temperature not above 120° C.

12. The method of making an improved fatty composition which comprises associating glycine and phosphoric acid with higher fatty acid monoester of a polyhydric alcohol at a temperature not higher than 95° C. to obtain a stabilized premixture and thereafter mixing the resulting premixture with fatty material selected from the group consisting of fatty triglycerides and fat-forming fatty acids, said mixing being effected at a temperature not higher than 120° C.

13. The method of making an improved fatty composition which comprises associating glycine and phosphoric acid with higher fatty acid monoglyceride at a temperature not higher than 95° C. to obtain a stabilized premixture and thereafter mixing the resulting premixture with fatty triglycerides at a temperature not higher than 120° C.

14. The method of making an improved fatty composition which comprises associating stabilizing amounts of glycine and phosphoric acid with a higher fatty acid monoglyceride at a temperature of 50°-95° C. and thereby obtaining a stabilized monoglyceride composition, and thereafter mixing said stabilized monoglyceride composition with fatty triglycerides at a temperature not higher than 120° C.

15. The method which comprises mixing substantially equal and stabilizing amounts of glycine and phosphoric acid with fatty acid monoglycerides, maintaining the resulting mixture at a temperature of 50°-95° C. for a time sufficient to stabilize said monoglycerides, and dispersing said monoglycerides containing said glycine and phosphoric acid in a shortening at a temperature not higher than 120° C.

16. The method which comprises mixing about 0.02% by weight of glycine and about 0.02% by weight of phosphoric acid into a monoglyceride composition consisting predominantly of cottonseed oil monoglycerides, maintaining the resulting mixture at a temperature of 50°-95° C. for a time sufficient to stabilize said monoglyceride composition, and dispersing the resulting stabilized monoglyceride composition in a vegetable shortening in an amount of 0.5%-5% of said composition based on the weight of said shortening, said dispersing being effected at a temperature not higher than 120° C.

17. A shortening composition comprising at least half lard and having dispersed in said lard a premixture of higher fatty acid mon glyceride and stabilizing amounts of glycine and phosphoric acid, said premixture having been obtained at a temperature not above 95° C. and incorporated into said lard at a temperature not above 120° C.

18. The method which comprises mixing stabilizing amounts of glycine and phosphoric acid with fatty acid monoglycerides, maintaining the resulting mixture at a temperature not above 95° C. for a time sufficient to stabilize said monoglycerides, and dispersing the resulting stabilized mixture into a shortening at a temperature not higher than 120° C.

19. An improved shortening fortified with a stabilized premixture of higher fatty acid monoglyceride, glycine and phosphoric acid.

No references cited.